United States Patent
Engelsmann et al.

[15] 3,688,661
[45] Sept. 5, 1972

[54] PHOTOGRAPHIC APPARATUS WITH AUTOMATICALLY AND MANUALLY ADJUSTABLE SHUTTER MEANS

[72] Inventors: Dieter Engelsmann, Unterhaching; Hubert Hackenberg; Helmut Prummer, both of Munich, all of Germany

[73] Assignee: Agfa-Gevaert Aktiengesellschaft, Leverkusen, Germany

[22] Filed: Feb. 18, 1971

[21] Appl. No.: 116,544

[30] Foreign Application Priority Data

March 19, 1970 Germany .........G 70 10 066.2

[52] U.S. Cl. ...................................95/11 R, 95/11 L
[51] Int. Cl. ...............................................G03b 19/02
[58] Field of Search.....95/11 L, 11 R, 59, 10 C, 11.5

[56] References Cited

UNITED STATES PATENTS

| | | | |
|---|---|---|---|
| 3,443,498 | 5/1969 | Bihlmaier | 95/11 R |
| 3,405,624 | 10/1968 | Peterson | 95/59 |
| 3,446,129 | 5/1969 | Burgarella | 95/10 CT |
| 3,051,066 | 8/1962 | Lareau et al. | 95/11 L |

FOREIGN PATENTS OR APPLICATIONS 1,037,503   7/1966   Great Britain .............95/11 L

*Primary Examiner*—John M. Horan
*Assistant Examiner*—Kenneth C. Hutchison
*Attorney*—Michael S. Striker

[57] ABSTRACT

A still camera wherein the shutter is automatically set to furnish a predetermined relatively long exposure time in response to mounting of a flashcube or a flash lamp on the camera body. When the lamp or the flashcube is detached, the shutter is adjustable by a rotary selector which places an arm of an indicating lever into an exposed position when the selected exposure time corresponds to the predetermined exposure time. The user of the camera is thereby warned that the selected exposure time is longer than normally required for the making of exposures in bright daylight. The shutter has one or more blades which are propelled to open positions by an impeller in response to actuation of the camera release.

9 Claims, 1 Drawing Figure

PATENTED SEP 5 1972
3,688,661
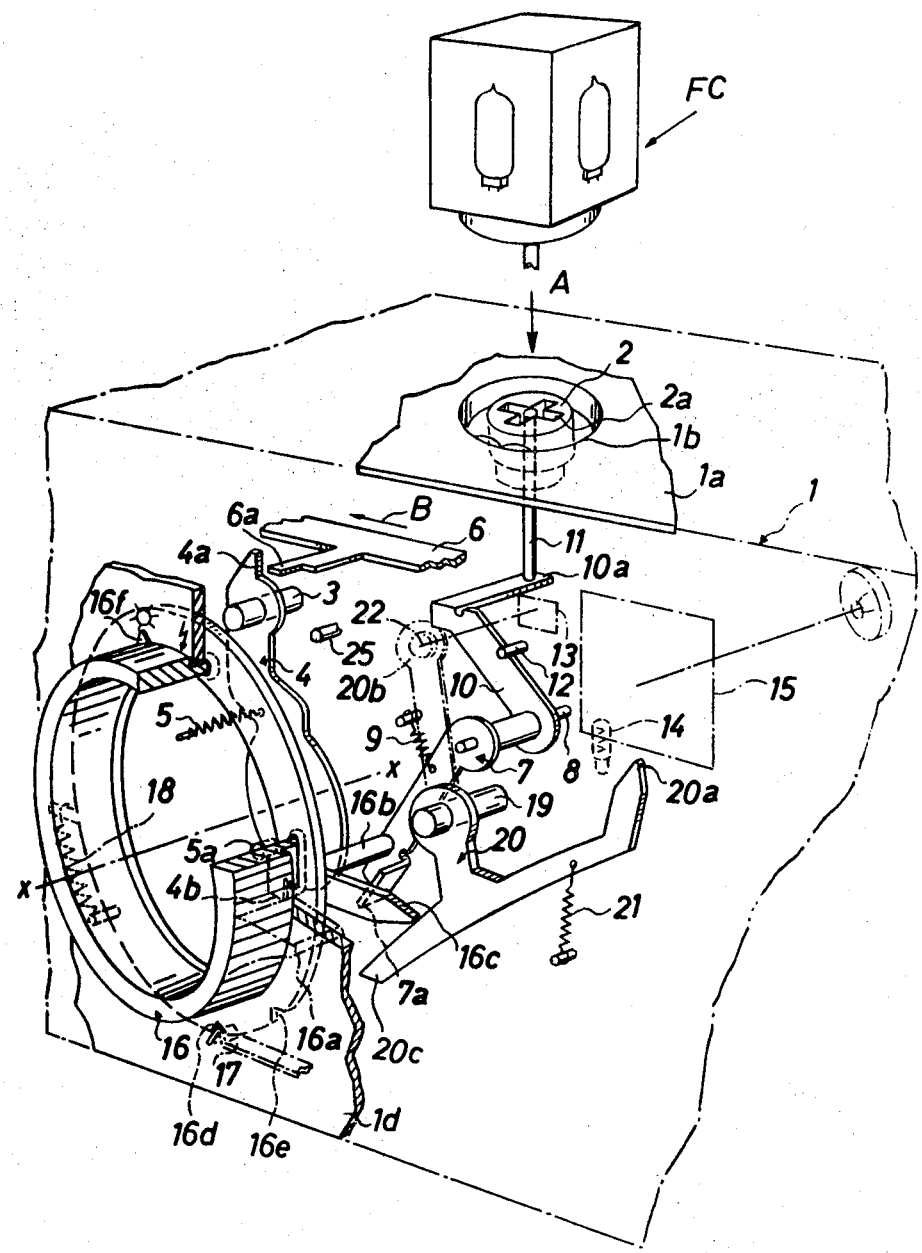
INVENTOR
DIETER ENGELSMANN
HUBERT HACKENBERG
HELMUT PRUMMER
BY
Attorney

PHOTOGRAPHIC APPARATUS WITH AUTOMATICALLY AND MANUALLY ADJUSTABLE SHUTTER MEANS

BACKGROUND OF THE INVENTION

The present invention relates to photographic apparatus in general, and more particularly to improvements in photographic apparatus with manually and automatically adjustable shutter means. Still more particularly, the invention relates to photographic apparatus with shutter means which is adjustable automatically or by hand and comprises one or more blades adapted to be propelled from positions in which the shutter means is closed.

It is already known to provide a still camera with a shutter wherein a blade is propelled from closed position by an impeller which is caused to strike against the shutter blade in response to actuation of the release element. It is also known to provide such cameras with adjustable arresting means which is movable into and from the path of the shutter blade to thereby determine the extent of movement of the blade from closed to open position and to thus determine the length of exposure time. In such cameras, the blade is normally biased to a closed position by a constant force furnished by one or more springs so that the length of the interval during which the shutter admits scene light to a film frame depends on the extent of movement of the blade from its closed position.

It is further known to provide the just described camera with a socket, accessory shoe or other receiving means for a flashcube with several flash bulbs, a single flash lamp or an electronic flash and to further provide means which automatically adjusts the arresting means so that the shutter is set to furnish an exposure time which is best suited for the making of exposures with artificial illumination of the subject.

A drawback of the just described cameras is that the shutter is not adjustable by hand so that it normally furnishes a single first exposure time for the making of exposures in daylight and a single second exposure time when the exposure is to be made with artificial illumination of the subject.

SUMMARY OF THE INVENTION

An object of the invention is to enhance the versatility of the just described cameras in such a way that the user can select one of several exposure times when the exposures are to be made without artificial illumination of the subject.

Another object of the invention is to provide a photographic apparatus with novel means for adjusting the arresting means which determines the extent of movement of one or more shutter blades from open position in response to impetus applied thereto by one or more impellers which are permitted to strike the blade or blades in response to actuation of the release element.

A further object of the invention is to provide the just outlined photographic apparatus with novel, improved, simple and rugged indicating means which indicates the setting of the shutter prior to making of exposures without artificial illumination of the subject.

An additional object of the invention is to provide the photographic apparatus with novel means for indicating whether or not the intensity of scene light suffices for the making of any exposures or for the making of exposures with the camera body held by hand.

The improved photographic apparatus comprises a shutter having one or more blade means movable from a closed position to a plurality of open positions to thus furnish a range of exposure times, impeller means which is operable to propel the blade means from the closed position, adjustable arresting means which is movable between at least one first position in which the blade means is arrested upon operation of the impeller means in a first open position corresponding to a relatively short exposure time (for example, an exposure time which is satisfactory for the making of exposures in bright daylight) and at least one second position in which the blade means is free to move in response to operation of the impeller means to a second open position corresponding to a relatively long exposure time (for example, 1/30 second, which is an exposure time often employed for the making of exposures with artificial illumination of the subject), illuminating means (such as a flashcube, a discrete flash lamp or an electronic flash) which is movable between operative and inoperative positions (for example, a flashcube is movable to and from an operative position in which it is attached to an indexible socket on the camera body), motion transmitting means for automatically maintaining the arresting means in one of the first and second positions in the operative position of the illuminating means (preferably in the second position which corresponds to the relatively long exposure time), selector means which is actuatable by the user to directly or indirectly effect movements of the arresting means between the first and second positions in the inoperative position of the illuminating means, and indicating means which is movable to an exposed position in response to such actuation of the selector means that the arresting means assumes the one position, namely, the position which corresponds to the operative position of the illuminating means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary perspective view of a still camera which embodies the invention.

DESCRIPTION OF THE PREFERRED EMBODIMENTS

The drawing illustrates a portion of a still camera having a housing or body 1 including a top wall 1a provided with an opening 1b for the base of an illuminating device, such as a conventional flashcube FC, which can be inserted in the direction indicated by an arrow A. When the flashcube FC assumes an operative position, its base is connected with a receptacle or socket 2 which is indexible by the film transporting mechanism of the camera to place successive bulbs of the flashcube to a position for illumination of the subject.

The front wall 1d of the body 1 supports a picture taking lens (not shown) having an optical axis X—X. The front wall 1d further supports the front lens of a viewfinder 15.

A simple shutter is mounted in the camera body 1 behind the picture taking lens. In the illustrated embodiment, the shutter comprises a single blade or vane 4 which is pivotable about the axis of a shaft 3 and is permanently biased to a closed position (shown in the drawing) in which it prevents scene light from reaching a film frame. The means for biasing the blade 4 to such closed position comprises a helical spring 5 which tends to maintain the blade in abutment with a fixed stop 5a. The blade 4 has a projection 4a which can be struck by the projection 6a of a reciprocable impeller 6 when the latter is permitted to leave the illustrated cocked position under the action of one or more springs, not shown. The illustrated impeller 6 can be constructed, mounted and operated in a manner as disclosed, for example, in U.S. Pat. No. 3,512,466. Thus, the impeller can serve to prevent double exposure of film frames by preventing repeated actuation of the release element prior to transport of the film by the length of a frame, to insure that the film can be transported only upon completion of an exposure and by the length of a frame, and to propel the shutter blade to a single open position or to one of several open positions. The arrangement is such that, when the impeller 6 is free to rapidly advance in the direction indicated by the arrow B, its projection 6a strikes the projection 4a and propels the blade 4 to one of several open positions whereby the blade stresses the spring 5. The spring 5 is free to dissipate energy as soon as the projection 6a moves beyond the projection 4a whereby the blade 4 automatically returns to the illustrated closed position. The length of the exposure time depends on the extent to which the blade 4 is free to move from the closed position. When the exposure is completed, the user operates the film transporting mechanism (not shown) which advances the film by the length of a frame and simultaneously returns the impeller 6 to the illustrated cocked position. The film transporting mechanism can cause the impeller 6 to perform a composite return movement so that its projection 6a bypasses the projection 4a of the blade 4(in closed position ) and thereupon moves forwardly (toward the front wall 1d) so that it can strike against the projection 4a when the impeller 6 is again free to move in the direction indicated by the arrow B.

The arresting means for the shutter blade 4 comprises a lever 7 which is pivotable about the axis of a horizontal shaft 8 and has a projection or lug 7a which can be moved into the path of the blade 4 to determine that one of at least two open positions which the blade 4 can reach in response to movement of the impeller 6 in the direction indicated by the arrow B. In the illustrated camera, the blade 4 is movable between a first open position (determined by the projection 7a of the arresting lever 7 in which the shutter furnishes a relatively short exposure time suited for the making of exposures in bright daylight, and a second open position (when the projection 7a is moved out of the way) in which the shutter furnishes a relatively long exposure time (e.g., 1/30 second) which is satisfactory for the making of exposures with artificial illumination of the subject. As shown, the lower portion of the blade 4 is provided with a second projection 4b which strikes against the projection 7a when the arresting lever 7 is free to assume the illustrated first position.

The motion transmitting means which serves to move the arresting lever 7 to a second position (in which the projection 7a is moved away from the path of the projection 4b on the shutter blade 4) comprises a reciprocable rod 11 which normally extends into a central opening 2a of the socket 2 and abuts against a platform 10a of a lever 10 which is rigidly connected to or made integral with the arresting lever 7. A helical spring 9 which is attached to the lever 7 and to a portion of the camera body 1 normally maintains the lever 10 in abutment with a stop post 12 whereby the platform 10a maintains the rod 11 in an upper end position. When the base of the flashcube FC is inserted into the opening 1b of the top wall 1a, a foot of the base enters the opening 2a and depressed the rod 11 to pivot the motion transmitting lever 10 in a counterclockwise direction, as viewed in the drawing, whereby the arresting lever 7 stresses the spring 9 and moves its projection 7a away from the path of projection 4b on the shutter blade 4. The shutter is then set to furnish a relatively long exposure time because the blade 4 can be propelled to that open position which is dependent on the impetus transmitted by the projection 6a when the impeller 6 is released for movement in the direction indicated by the arrow B. A stop 25 is provided to terminate the movement of the blade 4 from closed position when the projection 4b cannot strike against the projection 7a. When the base of the flashcube FC is withdrawn from the opening 1b, the spring 9 is normally free to pivot the levers 7, 10 in a clockwise direction whereby the rod 11 rises until the motion transmitting lever 10 reaches the post 12.

A photosensitive receiver 13 is mounted in or behind the front wall 1d of the camera body 1 so as to be normally exposed to scene light. This receiver is in circuit with a signal generating lamp 14 which is observable in the viewfinder 15 and lights up when the receiver 13 detects a scene light whose intensity is unsatisfactory for the making of exposures without artificial illumination of the subject or with the camera held by hand. The circuit which includes the receiver 13 and lamp 14 is well known in the art.

In accordance with a feature of the invention, the camera further comprises a ring-shaped selector 16 which is rotatably mounted on the front wall 1d of the body 1 and has a handgrip portion 16a and two detent notches 16d, 16e. The purpose of the selector 16 is to effect adjustments of the shutter when the flashcube FC (or another suitable illuminating device) is moved to an inoperative position. The flashcube FC assumes an inoperative position as soon as the foot of its base is withdrawn from the opening 2a of the socket 2. In the illustrated embodiment, the selector 16 is biased in a counterclockwise direction by a helical spring 18 which maintains the notch 16d in registry with the tip of an elastic detent arm 17 mounted in the camera body 1. The tip of the arm 17 enters the notch 16d and maintains the selector 16 in a first position in which the shutter blade 4 can furnish a relatively short exposure time. To this end, the selector 16 has an inwardly extending stud 16d which is disengaged from the projection 7a of the arresting lever 7 when the tip of the detent arm 17 extends into the notch 16d. When the selector 16 is rotated in a clockwise direction in response to the application of finger pressure against the handgrip portion 16a, the stud 16b pivots the arresting lever 7 against the opposition of the spring 9 so that the projection 7a moves away from the path of the projection 4b and permits the shutter blade 4 to move to that open position which corresponds to the longer exposure time, namely, that exposure time which is satisfactory for the making of exposures with artificial illumination of the subject. The tip of The detent arm 17 then enters the notch 16e and can but need not retain the selector 16 in the second position. The notch 16e can be omitted altogether and the camera body 1 can be provided with a suitable stop (not shown) which determines the extent of clockwise rotation of the selector 16 in response to the application of finger pressure against the handgrip portion 16a. It is assumed that the spring 18 is strong enough to return the selector 16 to the illustrated first position even when the tip of the arm 17 extends into the notch 16e, as soon as the finger pressure upon the handgrip portion 16a is terminated. It is further clear that the spring 18 can be omitted altogether; the selector 16 is then moved by hand to and from the illustrated position and can be releasably held in selected position by the arm 17 or by other suitable detent means.

The selector 16 further carries an index 16f which can be moved into registry with symbols provided on a scale of the front wall 1d. The symbols which are shown in the drawing include a sun symbol which indicates to the user that the shutter is set to furnish a relatively short exposure time and a thunderbolt symbol which indicates that the shutter is set to furnish a relatively long exposure time.

Still further, the selector 16 is provided with an extension 16c which can pivot a three-armed indicating lever 20. The latter is pivotable about the axis of a shaft 19 and is biased in a clockwise direction by a helical spring 21 which urges an arm 20c of the lever 20 against the extension 16c. Another arm 20a of the indicating lever 20 is moved from the illustrated concealed position to an exposed position, in which it is observable by looking through the viewfinder 15, in response to a clockwise rotation of the selector 16 to place the index 16f into registry with the thunderbolt symbol on the front wall 1d. Thus, the arm 20a can be observed only when the selector 16 sets the shutter to furnish a relatively long exposure time which is satisfactory for the making of exposures with artificial illumination of the subject. Since the motion transmitting means 10, 10a, 11 and the arresting lever 7 are not coupled to the indicating lever 20, the arm 20a can be seen in the viewfinder 15 only when the longer exposure time is set by the selector 16 but not when such longer exposure time is selected in automatic response to movement of the flashcube FC to its operative position.

A further arm 20b of the indicating lever 20 carries a filter 22 which is moved in front of the photosensitive receiver 13 when the arm 20a dwells in the illustrated concealed position, namely, when the index 16f of the selector 16 registers with the sun symbol on the front wall 1d. The light transmissivity of the filter 22 is such that it causes the receiver 13 to complete the circuit of the lamp 14 (i.e., the lamp 14 light up) when the intensity of incoming scene light a portion of which reaches the receiver 13 through the filter 22 is too weak for the making of exposures with the shorter exposure time.

When the selector 16 is rotated in a clockwise direction in response to the application of finger pressure against the handgrip portion 16a, the index 16f moves toward a position of registry with the thunderbolt symbol, the tip of the detent arm 17 is expelled from the notch 16d, the stud 16b pivots the arresting lever 7 in a counterclockwise direction, and the extension 16c pivots the arm 20c of the indicating lever 20 to move the filter 22 out of registry with the receiver 13 and to place the tip of the arm 20a into the exposed position. By looking through the viewfinder 15, the user of the camera can see the exposed portion of the arm 20a and is apprised of the fact that the shutter is set to furnish a relatively long exposure time while the flashcube FC is detached, i.e., while the exposure cannot be made with artificial illumination of the subject. The user is thereby warned that the selector 16 should be returned to the illustrated position (in which the projection 7a of the arresting lever 7 extends into the path of movement of projection 4b on the blade 4) if the intensity of scene light is satisfactory for the making of exposures with the shorter exposure time. As mentioned above, the arm 20a of the indicating lever 20 can be seen in the viewfinder 15 only when the lever 20 is pivoted by the extension 16c of the selector 16 but not when the arresting lever 7 is caused to move its projection 7a out of the path for the projection 4b of the blade 4 in response to movement of the flashcube FC to the operative position.

Since the filter 22 does not register with the receiver 13 when the arm 20a of the indicating lever 20 is observable in the viewfinder 15, the lamp 14 will light up and produce a visible signal only when the intensity of light in the area where the exposure is to be made is so weak that the camera cannot make satisfactory exposures with the longer exposure time.

The improved camera is susceptible of many additional modifications. For example, the simple one-blade shutter can be replaced with a more sophisticated shutter having two or more blades and the impeller 6 can be replaced with another suitable impeller which need not perform any additional functions or which performs only one additional function. Furthermore, the socket 2 can be replaced with a receptacle for discrete flash lamps or with an accessory shoe for an electronic flash. Still further, the signal generating lamp 14 can be omitted and the receiver 13 can be used to automatically adjust a suitable diaphragm as a function of scene brightness.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising a shutter movable from a closed position to a plurality of open positions to thus furnish a range of exposure times; impeller means operable to propel said shutter from said closed position; arresting means movable between at least one first position in which said shutter is arrested upon operation of said impeller means in a first open position corresponding to a relatively short exposure time and at least one second position in which said shutter is free to move in response to operation of said impeller means to a second open position corresponding to a relatively long exposure time; illuminating means movable between operative and inoperative positions; motion transmitting means for moving said arresting means to said second position in response to movement of said illuminating means to said operative position; selector means actuable to effect movements of said arresting means between said first and second positions in the inoperative position of said illuminating means; and indicating means movable to an exposed position in response to such actuation of said selector means that said arresting means assumes one of said positions thereof.

2. A combination as defined in claim 1, further comprising viewfinder means, said indicating means having a portion which is observable in said viewfinder means in said exposed position thereof.

3. A combination as defined in claim 1, wherein said selector means is actuable to move to first and second positions which respectively correspond to the first and second positions of said arresting means, and further comprising means for biasing said selector means to said first position thereof.

4. A combination as defined in claim 1, wherein said selector means is rotatable by hand.

5. A combination as defined in claim 1, further comprising photosensitive receiver means exposed to scene light and filter means movable from a first position in front of said receiver means to a second position out of registry with said receiver means in response to movement of said indicating means to said exposed position thereof.

6. A combination as defined in claim 5, wherein said filter means is provided on said indicating means.

7. A combination as defined in claim 5, further comprising signal generating means connected with said receiver means to produce signals in response to a predetermined intensity of light impinging on said receiver means.

8. In a photographic apparatus, a combination comprising a shutter movable from a closed position to a plurality of open positions to thus furnish a range of exposure times; impeller means operable to propel said shutter from said closed position; arresting means movable between at least one first position in which said shutter is arrested upon operation of said impeller means in a first open position corresponding to a relatively short exposure time and at least one second position in which said shutter is free to move in response to operation of said impeller means to a second open position corresponding to a relatively long exposure time; illuminating means movable between operative and inoperative positions; motion transmitting means for maintaining said arresting means in one of said first and second positions in the operative position of said illuminating means; selector means actuatable to effect movements of said arresting means between said first and second positions in the inoperative position of said illuminating means; indicating means movable to an exposed position in response to such actuation of said selector means that said arresting means assumes said one position; photosensitive receiver means exposed to scene light; and filter means movable from a first position in front of said receiver means to a second position out of registry with said receiver means in response to movement of said indicating means to said said exposed position thereof, said indicating means comprising a lever pivotable about a predetermined axis and having a first portion which is exposed in said one position of said arresting means, a second portion which supports said filter means, and a third portion which receives motion from said elector means.

9. In a photographic apparatus, a combination comprising a shutter movable from a closed position to a plurality of open positions to thus furnish a range of exposure times; impeller means operable to propel said shutter from said closed position; arresting means movable between at least one first position in which said shutter is arrested upon operation of said impeller means in a first open position corresponding to a relatively short exposure time and at least one second position in which said shutter is free to move in response to operation of said impeller means to a second open position corresponding to a relatively long exposure time, said arresting means comprising a first lever which is pivotable between said first and second positions thereof; illuminating means movable between operative and inoperative positions; motion transmitting means for maintaining said arresting means in one of said first and second positions in the operative position of said illuminating means, said motion transmitting means comprising a second lever rigid with said first lever and means for pivoting said second lever in response to movement of said illuminating means to said operative position; selector means actuable to effect movements of said arresting means between said first and second positions in the inoperative position of said illuminating means; and indicating means movable to an exposed position in response to such actuation of said selector means that said arresting means assumes said one position.

* * * * *